(12) United States Patent
Gunter (10) Patent No.: US 6,435,099 B2
(45) Date of Patent: Aug. 20, 2002

(54) POWERED PUSHING UNIT

(75) Inventor: James M. Gunter, Erie, PA (US)

(73) Assignee: Ridg-U-Rak, Inc., North East, PA (US)

( * ) Notice: Subject to any disclaimer, the term of this patent is extended or adjusted under 35 U.S.C. 154(b) by 0 days.

(21) Appl. No.: 09/825,544

(22) Filed: Apr. 2, 2001

Related U.S. Application Data (60) Provisional application No. 60/195,642, filed on Apr. 7, 2000, and provisional application No. 60/196,199, filed on Apr. 11, 2000.

(51) Int. Cl.$^7$ ............................................. B60M 13/00
(52) U.S. Cl. ................. 104/162; 104/172.1; 104/172.5; 198/746
(58) Field of Search ................. 104/162, 176, 104/165, 172.1, 172.5, 178, 206; 198/746, 732, 740

(56) References Cited

U.S. PATENT DOCUMENTS

| | | | |
|---|---|---|---|
| 3,044,416 A | 7/1962 | Reibel et al. ................ | 104/172 |
| 3,161,145 A | 12/1964 | Cargill et al. ................ | 104/172 |
| 3,420,188 A | 1/1969 | Dehne et al. ................ | 104/172 |
| 3,451,352 A | 6/1969 | Curry et al. ................ | 104/172 |
| 3,522,772 A | 8/1970 | Hunt .......................... | 104/162 |
| 3,556,011 A | 1/1971 | Saxonmeyer ................ | 104/48 |
| 3,659,530 A * | 5/1972 | Klamp ................. | 104/172 BT |
| 3,799,327 A * | 3/1974 | Schulz ........................ | 198/170 |
| 4,072,111 A | 2/1978 | Hoehn ........................ | 104/172 |
| 4,175,656 A * | 11/1979 | Lang .......................... | 198/748 |
| 4,252,064 A * | 2/1981 | Ratcliff, Jr. et al. ........ | 104/162 |
| 4,442,935 A | 4/1984 | Gregg ........................ | 198/648 |
| 4,732,524 A | 3/1988 | Suominen ................... | 414/267 |
| 4,790,427 A | 12/1988 | Dixon .................... | 198/803.01 |
| 4,793,261 A | 12/1988 | Schwaemmle ........... | 104/172.3 |
| 4,981,081 A | 1/1991 | Summa .................... | 104/172.5 |
| 5,070,996 A | 12/1991 | Schwaemmle et al. .. | 198/465.3 |
| 5,437,231 A | 8/1995 | Janzen et al. ............ | 104/172.4 |
| 5,694,993 A | 12/1997 | Cameron ................. | 144/245.1 |
| 5,695,044 A | 12/1997 | Morikiyo et al. ........... | 198/746 |

* cited by examiner

*Primary Examiner*—S. Joseph Morano
*Assistant Examiner*—Frantz F. Jules
(74) *Attorney, Agent, or Firm*—Edward W. Goebel, Jr.; Jon L. Woodard; MacDonald, Illig, Jones and Britton LLP (57) ABSTRACT

A powered pushing unit transfers ads no greater than a predetermined magnitude in one direction along the length of a load transfer system. The pushing unit includes a frame and a source of power for moving the pushing unit back and forth along the length of the load transfer system. A dog for engaging a load is pivotally mounted with respect to the frame. A restricting mechanism applies a load engaging force to hold the dog at a load transfer range of positions until the load is greater than the predetermined magnitude. A toggle joint is mounted between the dog and the frame. The toggle joint forms an angle in a first angular direction to lock the dog in a load engaging position during engagement of a load under the predetermined magnitude. The toggle joint further shifts to form an angle in a second angular direction upon engagement of a load in excess of the predetermined magnitude, thereby allowing the dog to pivot away from the load which is in excess of the predetermined magnitude. When pivoting away from and passing beneath the toad, the dog exerts a force against the load that is substantially less than the predetermined magnitude. A toggle force mechanism returns the toggle joint to a first angular direction after the dog passes the load.

16 Claims, 10 Drawing Sheets

POWERED PUSHING UNIT

This application claims the benefit of U. S. Provisional Application Nos. 60/195,642 filed on Apr. 7, 2000 and 60/196,199 filed on Apr. 11, 2000, which are incorporated herein by reference.

BACKGROUND

This invention relates generally to powered pushing units for moving loads from one point to another along a selected path, and more particularly, to powered pushing units for moving loads in one direction while transferring back and forth along a selected path.

Powered pushing units are used in many applications to transfer loads between two or more different points along a predetermined path. For example, in railroad applications pushing units called dog carriages or table sleds move railway cars from one point to another for various purposes. Pusher conveyors use powered pushing units, sometimes called shuttles, to transfer loads from one point to another along the lengths of the conveyors. Some pusher conveyors incorporate a centrally located, stationary motor for providing power throughout the conveyor system. Loads are engaged and transferred with one or more pushing elements, known as a dog or dogs, that are located apart from the stationary motor. The motor then supplies power to the dogs remotely with the use of a separate power track or with the use of a roller and pulley or a drive chain arrangement. The dogs may either contact the load directly or contact one or more load bearing trolleys or carriages supported from a second driving track. Some designs incorporate toggle or pivot mechanisms that allow for variable or one-directional engagement of loads with a dog.

For example, U.S. Patents to Hoehn (U.S. Pat. No. 4,072,111) and Curry, et al. (U.S. Pat. No. 3,451,352) each disclose multiple-track conveyor systems where two or more independent, closed loop driving tracks include a plurality of pushing dogs that independently engage one or more load-bearing trolleys. The trolleys themselves have power engaging dogs along a separate load-bearing track. Mechanisms variably disengage the pushing dogs by retracting power engaging dogs when contact is made with adjacent trolleys. In their construction, these systems require room and added expense for at least three separate tracks and many individual dogs, along with additional maintenance time and costs for a large number of components. Since each driving track is a closed loop, breakage of any component of the closed loop necessarily making the entire driving track inoperative. Furthermore, since each driving track is also solely responsible for transferring loads along a particular leg of the conveyor, inoperativeness of any one driving track normally leads to inoperativeness of the entire conveyor system.

Some of the inherent shortcomings of these closed loop systems can be overcome with the use of unitary, individually powered pushing units. Such units typically incorporate a toggle or pivot mechanism for actively engaging or for bypassing a load along the length of the conveyor track. U.S. Patents to Saxonmeyer (U.S. Pat. No. 3,556,011) and Hunt (U.S. Pat. No. 3,522,772) each disclose railroad car movers having pushing units capable of two-directional travel and incorporating toggle mechanisms for allowing dogs to rigidly engage loads in a first direction and for bypassing loads in a second direction. U.S. Patent to Morikiyo (5,695,044) discloses a pushing unit allowing for the same one-directional engagement but incorporating a more simple dog and pivot mechanism. Power for the pushing unit is provided externally, such as by the use of a chain or pulley. In all of the foregoing pushing unit designs, forward load engagement in the first direction is rigid, and no mechanism for releasing excessive loads is disclosed. The lack of such a mechanism may present a problem relating to the dependability and service life of a car moving or other conveyor system. For example, in the case where a conveyor is used to transfer variably loaded pallets, accidental overloading of one or more pallets can result in a pushing unit encountering a force greater than the pushing unit's intended transfer capacity. Such an excessive load force can result from one or more loads becoming jammed along the path of the pushing unit. In the absence of a suitable release mechanism, excessive wear or damage to the pushing unit or power source may also result. Although a suitable trip mechanism may be incorporated into a system to terminate power to the pushing unit upon the occurrence of such an overload, such a solution normally requires a temporary shutdown of the entire system and for some systems may lead to the need for further repairs or maintenance of the conveyor. Where multiple pushing units in a system depend upon a single, centralized power source, other pushing units, as a consequence, remain inoperative during the period of temporary shutdown.

One previous attempt to incorporate an overload release mechanism into a conveyor system does not deal with these shortcomings. U.S. Patent to Janzen, et al. (U.S. Pat. No. 5,437,231) discloses a two-track, continuous conveyor system, the upper track having powered claws pivotally mounted for engaging load-bearing carriages along the second track. The claws are positioned with a simple spring loaded pivot to engage the load bearing carriages and can bypass a carriage when a carriage is jammed or overloaded on the second track. After bypassing a jammed carriage, the claws are incapable of returning to their load engaging position without manual resetting. Since Janzen discloses a continuous conveyor, such resetting necessarily requires a shutdown of the entire system before the claws are again able to engage loads. In addition, Janzen requires additional space and the added expenses that are associated with multiple track systems.

SUMMARY

The present invention is a powered pushing unit for transferring loads no greater than a predetermined magnitude in one direction along the length of a load transfer system. The pushing unit includes a frame and a source of power for moving the pushing unit back and forth along the length of the load transfer system.

A dog for engaging a load is pivotally mounted with respect to the frame. A restricting mechanism applies a load engaging force to hold the dog at a load transfer range of positions until the load is greater than the predetermined magnitude. A dog spring which has a dog spring force pivots the dog toward a load engaging position on the dog support arm to engage and transfer loads when the frame is traveling in a first direction. The dog pivots against the dog spring force to bypass loads when the frame is traveling in a direction opposite that in which it pushes loads.

The pushing unit further includes a toggle joint connected between the dog and the frame. The toggle joint forms an angle in a first angular direction to lock the dog in a load engaging position during engagement of a load under the predetermined magnitude. The toggle joint further shifts to form an angle in a second angular direction upon engagement of a load in excess of the predetermined magnitude, thereby allowing the dog to pivot away from the load which is in excess of the predetermined magnitude.

A toggle force mechanism is interconnected between the frame and the pivot of the toggle joint to apply a toggle force, which is substantially less than the predetermined magnitude, to bias the toggle joint in the first angular direction with respect to the pivot. When the dog is pivoted away from the load due to a load in excess of the predetermined magnitude, the toggle force mechanism exerts a force substantially less than the predetermined magnitude on the dog and from the dog to the load. The toggle force mechanism then returns the toggle joint to the first angular direction after the dog passes the load.

Various features, advantages, and characteristics of the present invention will become apparent to one of ordinary skill in the art while reading the following specification. This invention does not reside in any one of the features of the powered pusher unit disclosed above and in the following Detailed Description of Preferred Embodiments and claimed below. Rather, this invention is distinguished from the prior art by its particular combination of features which are disclosed. Important features of this invention have been described below and shown in the drawings to illustrate the best mode contemplated to date for carrying out this invention.

Those skilled in the art will realize that this invention is capable of embodiments which are different from those shown and described below and that the details of the structure of this powered pusher unit can be changed in various manners without departing from the scope of this invention. Accordingly, the drawings and description below are to be regarded as illustrative in nature and are not to restrict the scope of the invention. The claims are to be regarded as including such equivalent powered pusher units as do not depart from the spirit and scope of the invention.

BRIEF DESCRIPTION OF THE DRAWINGS

For a more complete understanding and appreciation of this invention and many of its advantages, reference should be made to the following, detailed description taken in conjunction with the accompanyin drawings wherein:

FIG. 1A–E are sectional views of the intercomponent operation of pushing dog support arm and toggle release mechanisms according to one embodiment of the invention;

DETAILED DESCRIPTION OF PREFERRED EMBODIMENTS

Referring to the drawings, identical reference numerals and letters designate the same or corresponding parts throughout the several figures shown in the drawings.

Figure 1A:
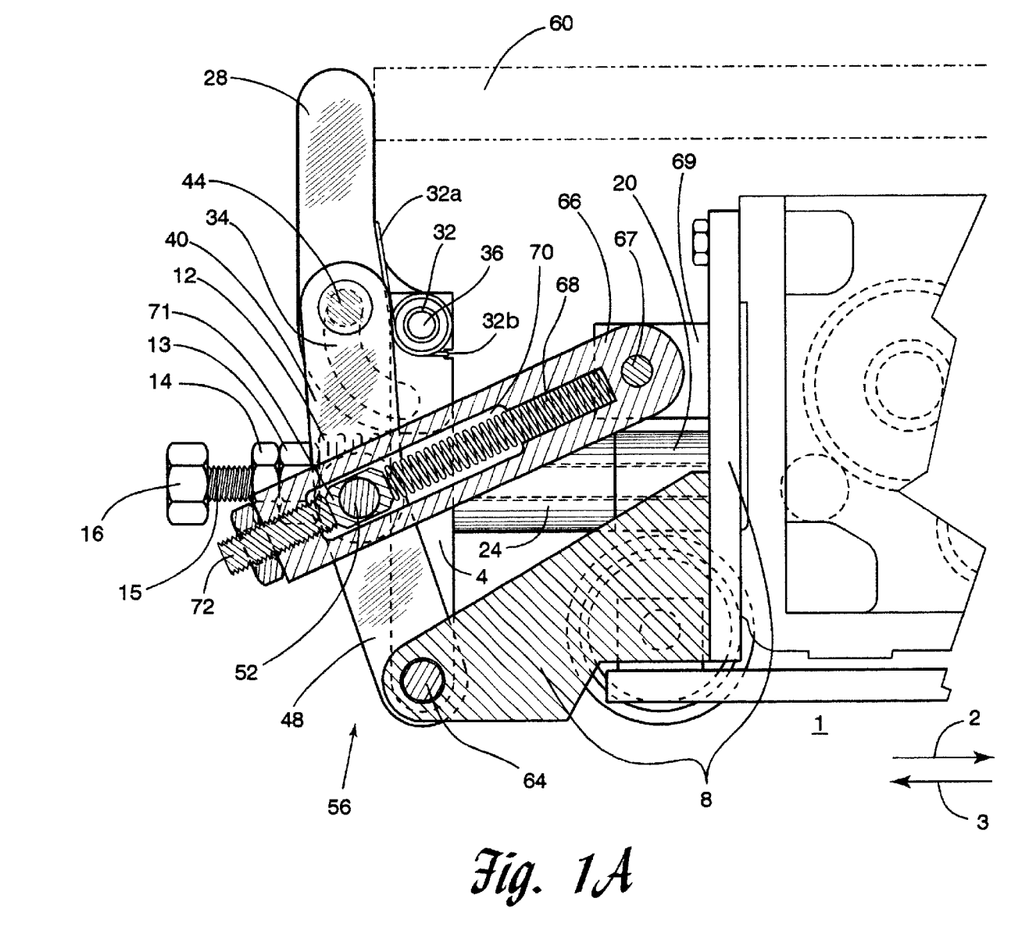
Figure 2A:
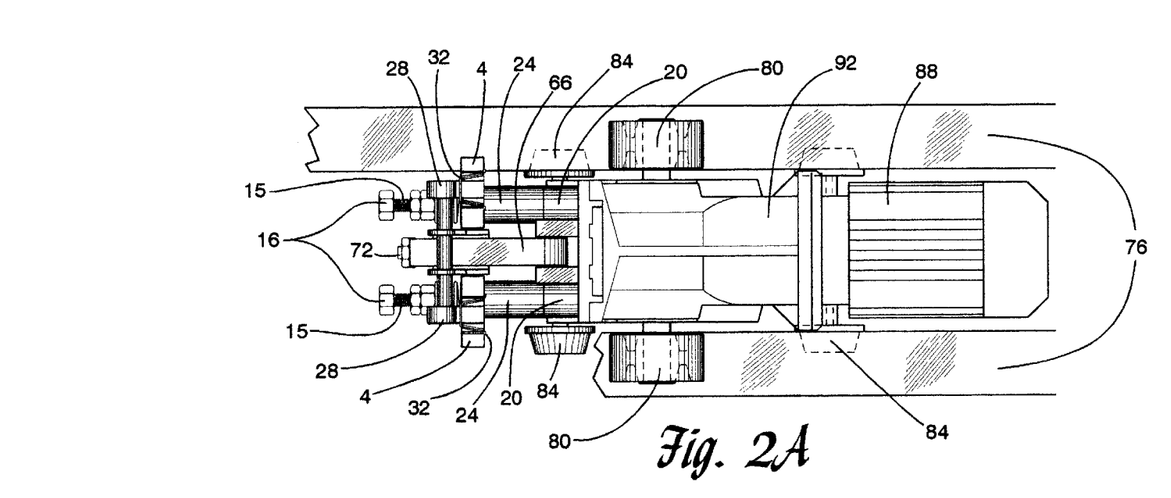
FIGS. 2A–C respective top, side, and end views of an independently powered I-beam track pushing unit having a pair of pushing dog, support arm and toggle release mechanisms according to one embodiment of the invention.
Figure 2B:
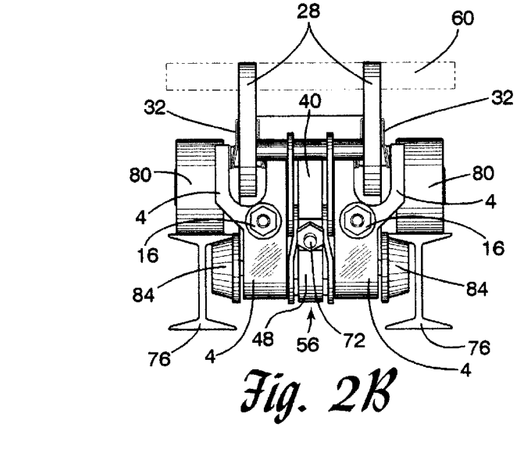
Figure 2C:
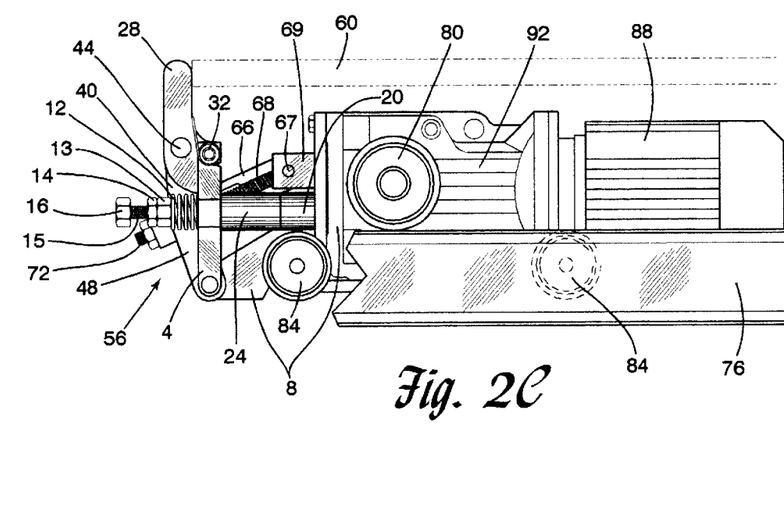

FIG. 1A shows a powered pushing unit 1 constructed according to this invention for transferring a load no greater than a predetermined magnitude along the length of a load transfer system such as a conveyor. For the purpose of describing this invention, the size of a load is the amount of force required to push that load along the conveyor. Since conveyors normally use rollers, ball bearings or similar devices which minimize friction, the amount of force required to push a particular load will normally be significantly less than the weight of the load itself Additionally, while FIGS. 1A–F show single dog, support arm and toggle release mechanisms for pushing a load, FIGS. 2A–2C show the use of a pair of each such mechanism used to push heavier loads. If desired, more than two of the dog, support arm and toggle release mechanisms could be used to push even heavier loads.

The powered pushing unit 1, often referred to as a shuttle, has a dog support arm 4 which is pivotally mounted on a pushing unit frame 8. The frame 8, including its various components, can be welded or bolted together or made as a casting. The dog support arm 4 is biased to an upright load transferring position by a restricting mechanism which is shown in FIG. 1A as a support spring 12. As will be explained more fully below, the support spring 12 holds the dog support arm 4 within a range of load transfer positions as long as the load is no greater than a predetermined magnitude determined by an operator of the powered pushing unit 1.

The support spring 12 is mounted over threads 15 of a support bolt 16 and is compressed between an adjusting nut 13 and the support arm 4. The adjusting nut 13 is mounted on the threads 15 of the support bolt 16 and is locked into a preselected position with a lock nut 14.

The support bolt 16 can be connected to the pushing unit frame 8 by extending within a threaded hole through a metal connector 20 which is welded directly to the pushing unit frame 8 as shown in FIG. 1A. The threads 15 of the support bolt 16 are threaded into mating threads within the connector 20. Alternatively, the support bolt 16 can be threaded directly into a hole within the pushing unit frame 8.

A spacer element 24 or other padding device is interposed between each support arm 4 and metal connector 20. The spacer element 24 may be constructed of metal or preferably a flexible material such as rubber, resilient plastic and the like, and serves to orient the support arm 4 to an upright position while under continued compression by support springs 12. As shown, the spacer element 24 may be cylindrical in its construction to accommodate a support bolt 16.

The force of the support spring 12 can be varied by adjusting the amount of its compression between support arm 4 and adjusting nut 13. This is accomplished by varying the position of the adjusting nut 13 on the threads 15 of support bolt 16. As will be more clearly explained below, the spring force required will vary according to the maximum load which the pushing unit 1 is to push along the conveyor.

The size of the support spring 12 can also be changed to accommodate different sized loads. The purpose of the support spring 12 is to limit the pivotal movement of the support arm 4 to within a range of load transfer positions until the load is greater than the predetermined maximum load to be pushed. Those skilled in the art will recognize that any movement restricting mechanism which can exert a force against the support arm may be substituted for the support spring 12 to restrict the movement of the support arm 4 in accordance with the principles of this invention. Support spring 12 could be replaced by a component made of rubber or other elastic material.

A dog 28 is pivotally mounted on a pin 36 positioned at the top of the support arm 4. A dog spring 32 is also mounted on the pin 36 and has one spring end 32a contacting the dog 28 and the other spring end 32b contacting the support arm 4. Thus, the spring 32 exerts a load engaging force between the support arm 4 and the dog 28 to cause the dog 28 to rotate in a counterclockwise direction.

The dog 28 includes a curved slot 34 that is in sliding engagement with a sliding pin 44 of an upper toggle link 40. The sliding pin 44 can travel along the curved path of the curved slot 34 to allow the dog 28 to pivot in a clockwise direction about the pin 36 and against the force of the spring 32. In view of FIGS. 1A–1E, the force of the spring 32 rotates the dog 28 in a counterclockwise direction until the top of the curve slot 34 contacts the sliding pin 44 to prevent the dog 28 from rotating beyond its upright, load engaging position.

A toggle joint 56 includes the upper toggle link 40 and a lower toggle link 48 which are interconnected at a toggle pivot 52. As explained above, the upper toggle link 40 is connected through its sliding pin 44 to the curved slot 34 of the dog 28. The lower toggle link 48 is pivotally connected between both the toggle pivot 52 and a pin 64 on frame 8. The support arm 4 is also pivotally connected to the pin 64.

The toggle joint 56 forms an angular orientation with respect to the pivot 52 which is pointed away from the powered pushing unit frame 8 during the normal operation of the powered pushing unit 1 as shown in FIG. 1A. As long as the upper and lower toggle links 40 and 48 of the toggle joint 56 maintain this angular orientation, the dog 28 remains locked in its upright position due to contact between the upper end of the curved slot 34 and the sliding pin 44 as shown in FIG. 1A. Thus, in FIG. 1A, the dog 28 can only rotate in a clockwise direction about the pin 36, against the force of the dog spring 32.

A central adjustable link 66 is interconnected between the toggle pivot 52 and a pin 67 mounted on an extension 69 of the powered pushing unit frame 8. The central adjustable link 66 includes a slot 70. The toggle pivot 52 is mounted within a rectangular slide 71 which is shaped to enable the pivot to move along the slot 70.

A toggle biasing mechanism 68, shown as a coil spring, is mounted within the central adjustable link 66 so as to be effectively mounted between the extension 69 of the powered pushing unit frame 8 and the toggle pivot 52. The spring 68 has a spring force which is substantially less than the spring force of the coil spring 12 and is thus substantially less than the predetermined maximum load which the powered pushing unit will push. As can be seen in FIGS. 1A–1E, one end of the toggle spring 68 is mounted within an extension of the slot 70 and is stationary throughout the operation of the toggle joint 56. The other end of the toggle spring 68 contacts one end of the slide 71 in which the toggle pivot 52 is mounted. An adjustable toggle bolt 72 is inserted through a threaded hole at the free end of central adjustable link 66. The end of toggle bolt 72 which extends into slot 70 contacts an end of the slide 71 opposite to the end of the slot 70 which is contacted by the toggle spring. As a result, rotating the bolt 72 so that a greater portion of its length extends within the slot 70 compresses the toggle spring 68 to increase its force on toggle pivot 52 that pushes or biases the toggle joint 56 in the first angular direction with respect to the toggle pivot 52. Decreasing the length of the toggle bolt 72 in the slot 70 decreases the force of the toggle spring 68 on the toggle pivot 52.

Consider engagement of a load 60 in a forward direction 2 by the powered pushing unit 1 when the load 60 is less than a maximum predetermined magnitude. The dog 28 contacts the load 60 and the load 60 exerts a force on the dog 28 and dog pivot 36. The dog 28 will be naturally inclined to rotate on its pivot 36 in a counterclockwise direction, but will be restricted from doing so by sliding pin 44. A force will also be exerted on the dog's pivot 36 and support arm 4, which will in turn exert a force on support spring 12. The spring force of support spring 12 on the support arm 4 has been adjusted by the operator to be commensurate with the predetermined maximum size of the load which is to be pushed. Thus, there will be no significant compression of the support spring 12, by lesser loads, and support arm 4 will remain substantially in its upright position as shown in FIG. 1A. So long as support arm 4 remains upright, upper and lower toggle links 40 and 48 of the toggle joint 56 continues to retain an angular orientation with respect to toggle pivot 52 away from powered pushing unit frame 8. As a result, the dog 28 as locked and prevented from rotating away from the load 60, allowing the load 60 to be conveyed in the forward direction 2.

Now consider engagement of a load 60 in the forward direction 2 where the load 60 is greater than a maximum predetermined magnitude. The dog 28 again contacts and receives the force of the load 60. The dog's pivot 36 and support arm 4 bear the load from dog 28, and as a result, support arm 4 exerts a force on support spring 12. Since the magnitude of the load 60 is in this case greater than the predetermined magnitude, support spring 12 is no longer capable of bearing the load as exerted by the dog 28 and support arm 4. As a result, support spring 12 begins to compress and the dog 28 and support arm 4 begin to rotate about support arm pivot 64.

Figure 1B:
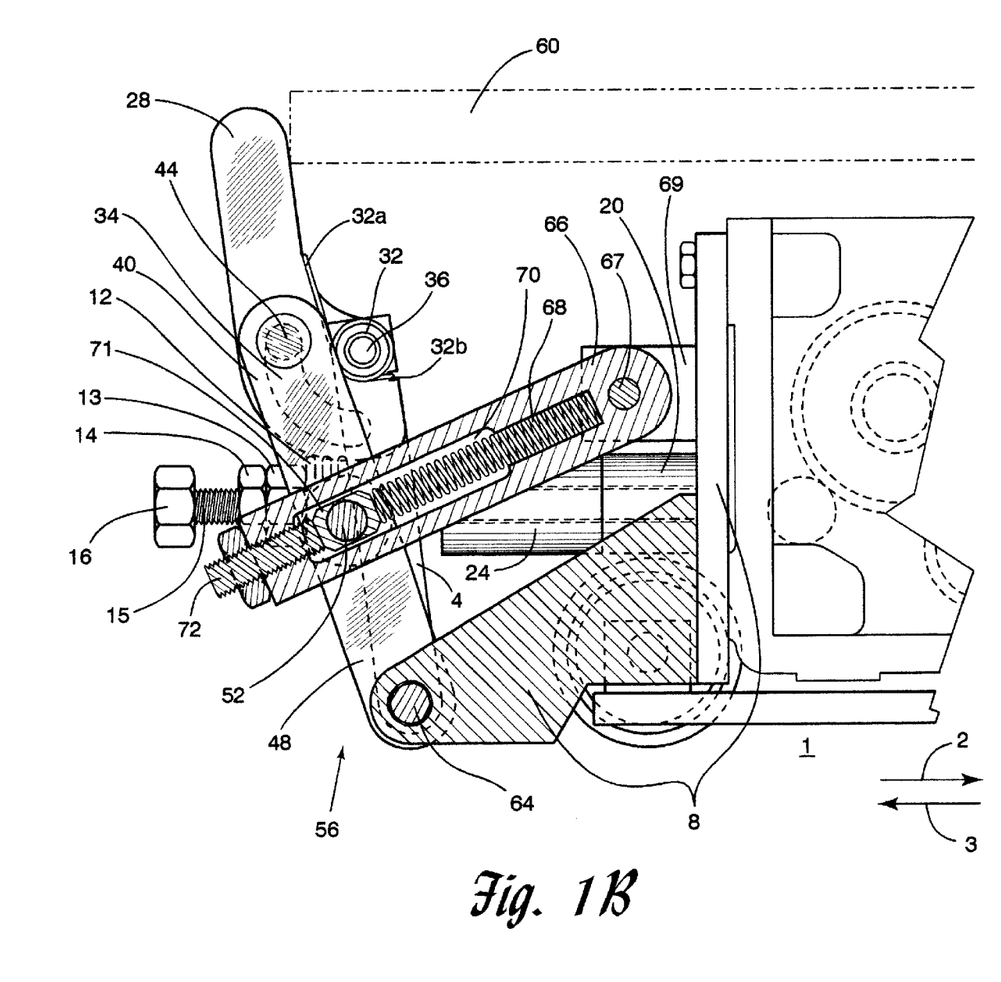
Figure 1C:
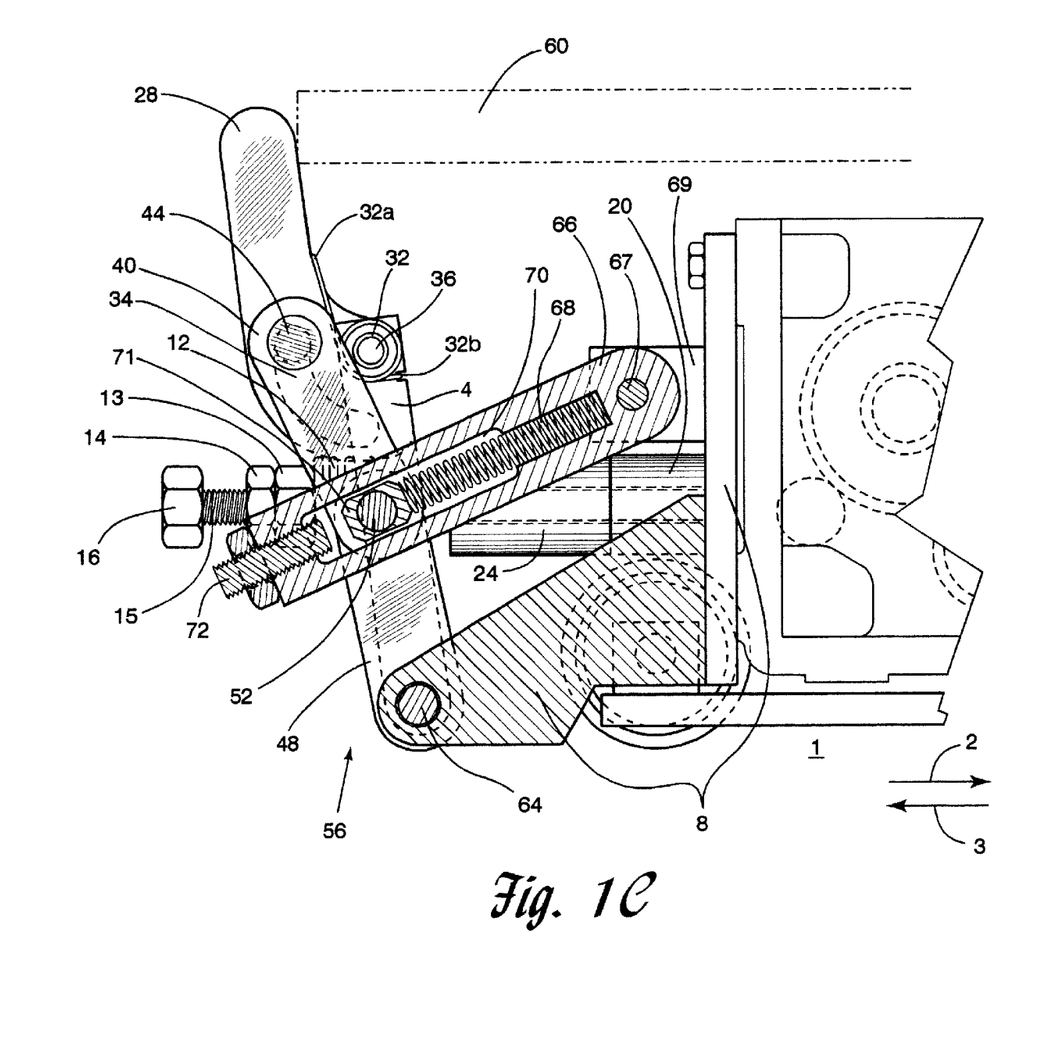
Figure 1D:
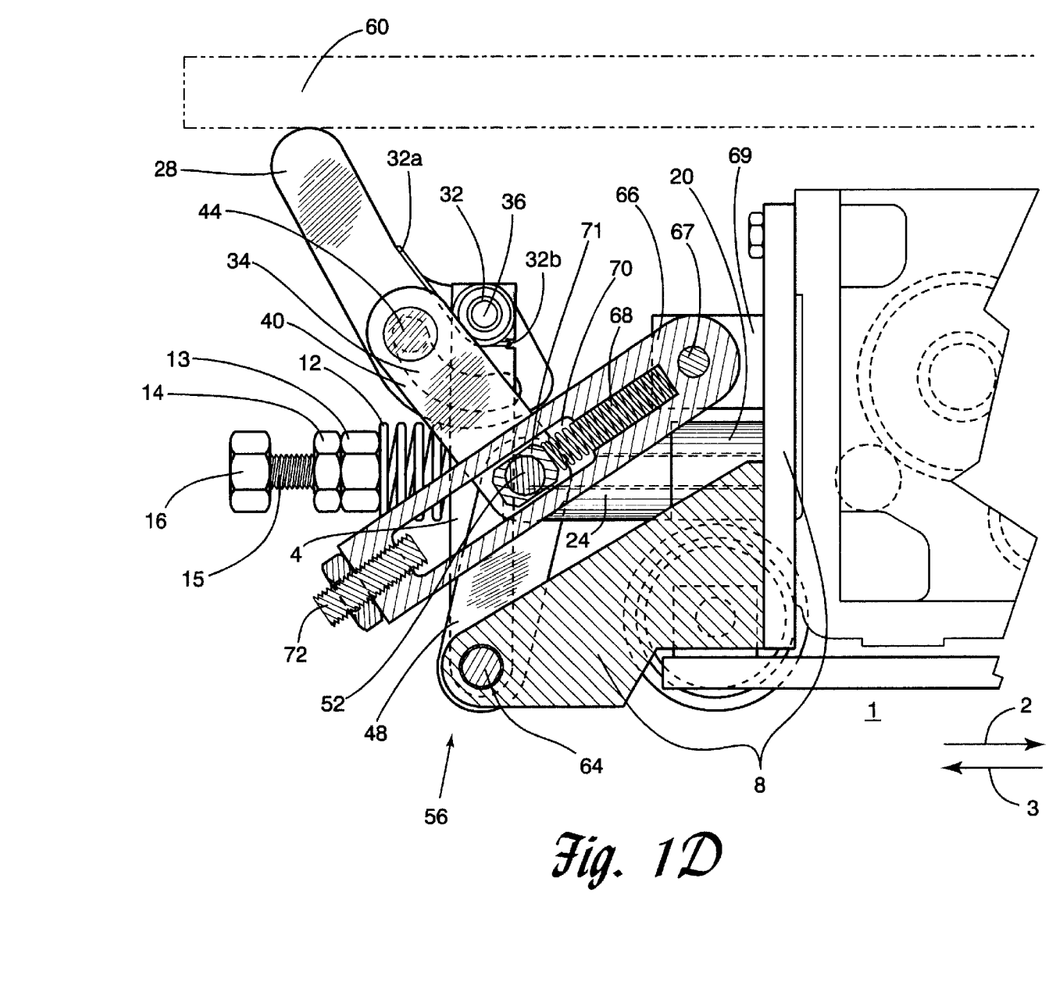

Referring now to FIG. 1B, as the support arm 4 continues to rotate about the support arm pivot 64, the sliding pin 44 rotates the upper toggle link 40 about toggle joint 52, while each lower link 48 remains stationary. Support spring 12 continues to compress and toggle joint 56 becomes increasingly elongated, varying the joint's angular orientation with respect to the powered pushing unit frame 8 until the toggle joint 56 is fully elongated as shown in FIG. 1B. This full elongation of the toggle joint 56 releases the joint's locking effect on the dog 28. FIG 1C illustrates the beginning rotational movement of the dog 28 resulting from the unlocking effect of the toggle joint 56. The toggle joint 56 assumes a new angular orientation with respect to the toggle pivot 52, pointed toward powered pushing unit frame 8. With the termination of the locking action by the toggle joint 56, the sliding pin 44 no longer restricts the rotation of the dog 28 about its pivot 36 in a counterclockwise direction. Thus, the toggle 56 permits the dog 28 to rotate and thereby yield to the force of the load 60, as illustrated in FIG. 1D. The termination of the toggle joint's locking action also permits support arm 4 to return to its upright position due to the released compression of support spring 12, as further illustrated in FIG. 1D.

The force of the toggle spring 68 should be a fraction of the magnitude of the strength of support spring 12. Thus, while the toggle joint 56 is in the position shown in FIG. 1D, the force of the dog 28 against the bottom of the load 60 is substantially less than the force of the support spring 12. This substantially lower force minimizes any risk that the dog 12 will upset or damage the load 60 as it bypasses this load. When the dog 28 bypasses the load 60 so that it no longer contacts the bottom of the load 60, the force of the toggle spring pushes the toggle joint 56 to its previous locked position shown in FIG. 1A. Thus, after bypassing a load greater than the predetermined maximum level, the powered pushing unit automatically resets itself to engage subsequent loads along its path.

Those skilled in the art will understand that although the maximum predetermined magnitude of the load will be commensurate with the spring force of the support spring 12 used, characteristics inherent to the design of this invention permit the adjustment of the maximum load capacity of the pushing unit. For example, further compression of support spring 12 with adjusting nut 13 increases the load force required to compress the spring with support arm 4, thereby increasing the load required to effect the initial rotation of dog 28. The maximum predetermined magnitude can also be adjusted by altering the relative angle between the toggle links 40 and 48 of toggle joint 56 to increase the amount the support arm 4 must rotate to cause the toggle joint 56 to assume the angular orientation shown in FIG. 1E.

Adjustment of return spring bolt 72 repositions the toggle pivot 52 against the return spring 68, variably increasing or decreasing the angle shown in FIG. 1A of the toggle joint 56 with respect to the powered pushing unit frame 8. Increasing the angle of the toggle joint 56 results in a load of a greater predetermined magnitude being required to compress support spring 12 to the point in which the toggle joint 56 will take on a linear orientation shown in FIGS. 1B–1D so as to unlock the dog 28. Reducing the angle of the unloaded toggle joint 56 results in a lesser force being required to unlock the toggle joint 56, thereby lowering the predetermined magnitude.

Referring to FIG. 1A and then to FIG. 1E, consider engagement of a load 60 while the pusher unit 1 is traveling in the reverse direction 3. The toggle joint 56 continues to lock the dog 28, preventing rotation in a counterclockwise direction. However, contact by the dog with the load 28 when the pusher unit 1 is traveling in direction 3 permits springing engagement between the dog 28 and the load 60 and rotation in a clockwise direction against the force of the dog spring 32. Thus, the shuttle will effectively bypass all loads it encounters while traveling in the reverse direction 3. The dog spring 32 will cause the dog to rotate in a counterclockwise direction to its upright position shown in FIG. 1A after the dog passes the load 60.

In traveling in either the forward direction 2 or reverse direction 3, the powered pushing unit follows a predetermined path along a stationary rack. The stationary rack can be any one of a number of appropriate embodiments, including for example, an I-beam, gutter, rails and the like.

FIGS. 2A–2C show one preferred embodiment of this invention with two parallel I-beam tracks 76 which the powered pushing unit 1 engages with a combination of drive wheels 80 and reaction wheels 84. The drive wheels 80 effect movement of the shuttle in both the forward and reverse directions, powered by an electric motor 88 connected through a gearbox 92, each of which is incorporated into frame 8 of the powered pushing unit 1. FIGS. 2A–2C also show the use of two sets of dogs 28, toggle joints 56 and other components of the pushing unit 1 for pushing heavier loads. One or more additional sets of components could be used for even heavier loads if desired.

Figures 6, 7:
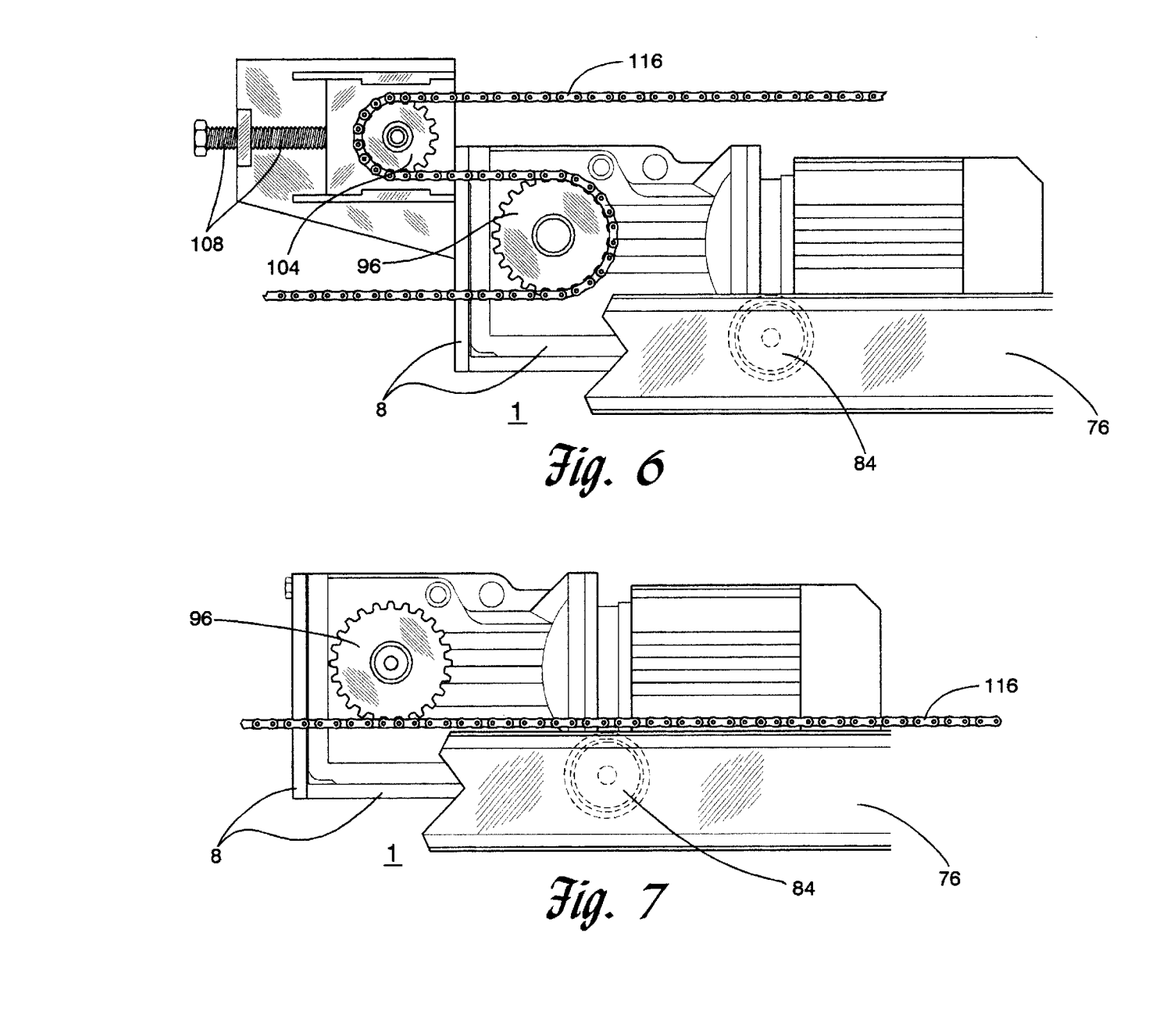
FIG. 6 illustrates and adjustable, two-cog drive system for powering a pushing unit made in accordance with this invention.
FIG. 7 illustrates a single-cog drive system for powering a pushing unit made in accordance with this invention.

In alternative embodiments, one or more cogs can be used in lieu of a drive wheel for effecting movement of the pushing unit along a substantially stationary chain, tooth bar, rack, or other grooved track device. FIG. 7 illustrates such an embodiment that includes a powered cog-drive wheel 96 for effecting movements of the pushing unit 1 along a rigid chain 100. An additional adjustable cog 104 may be added to the arrangement so that chain tension can be adjusted with a cog-adjusting bolt 108, as illustrated in FIG. 6.

Figure 3:
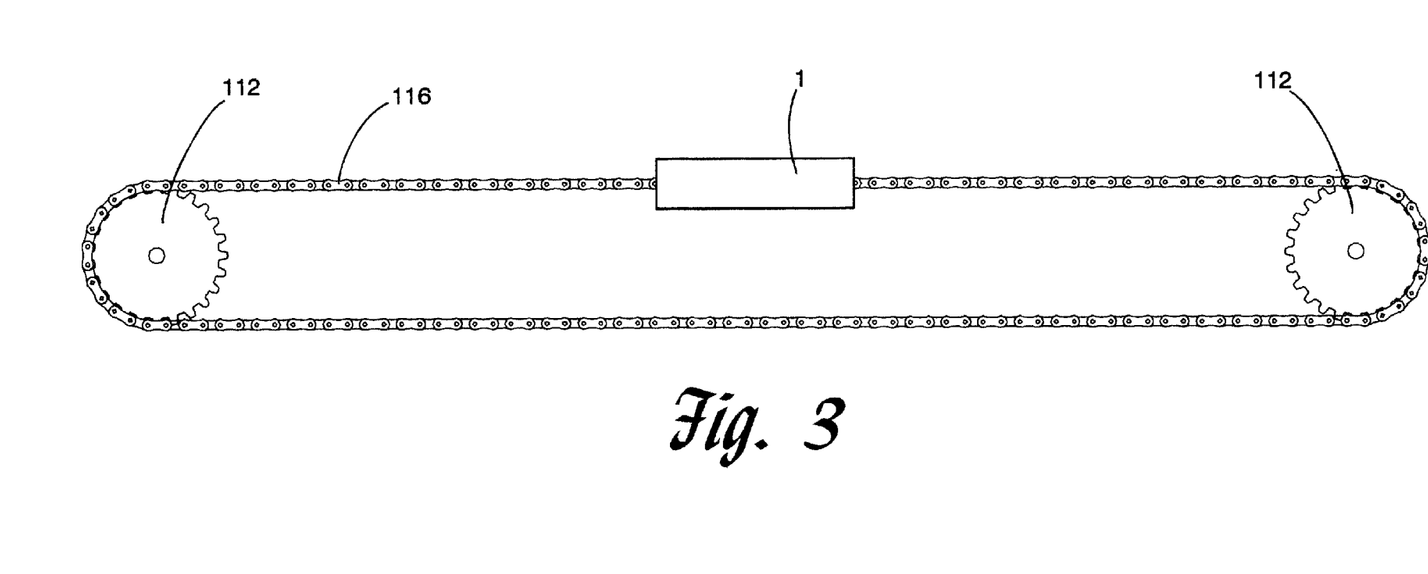
FIG. 3 illustrates an alternative cog-wheel and chain arrangement for externally powering a power pushing unit according to one embodiment of the invention.

Additional embodiments of the invention may effect movement of the pushing unit through an external power source connected to the pushing unit through a chain, cable, flexi-band, or other apparatus. In such an arrangement, chain-cogs 112 can be situated at either end of the powered pushing unit's path as illustrated in FIG. 3. Although the invention is shown in FIG. 3 as incorporating chain-cogs 112 and a drive chain 116 attached to either end of the pushing unit, it will be appreciated that other embodiments using non-toothed apparatuses such as cables and flexi-bands may incorporate devices such as pulleys, drums, and the like in lieu of cogged elements.

Figure 4:
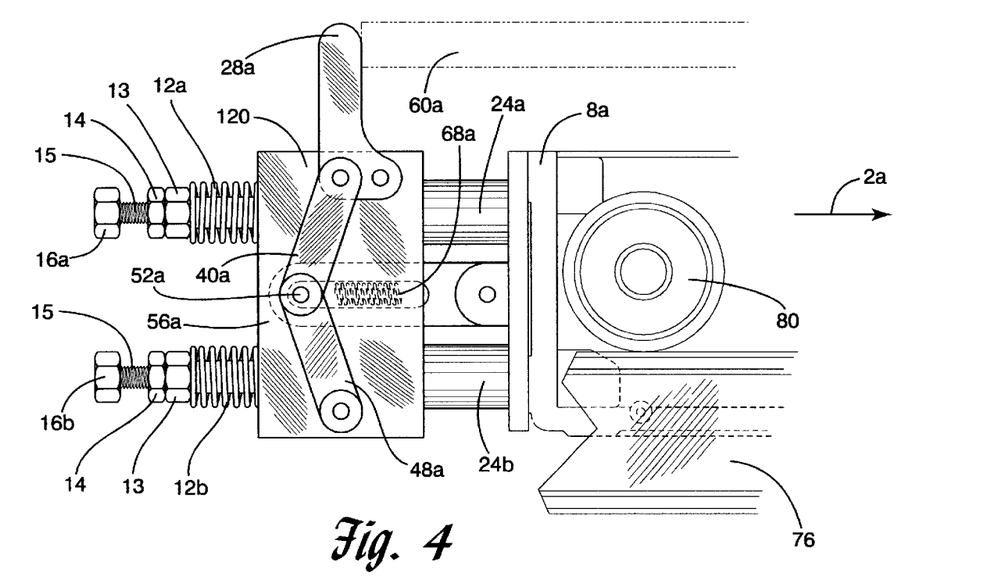
FIG. 4 is a sectional view of a pushing dog and toggle release mechanism incorporating an alternative, non-stationary load block according to one embodiment of the invention.

Although the invention is shown and described hereinbefore with a toggle release mechanism incorporating a described arrangement of levers and adjustable spring elements, it will appreciated that variations in the construction and orientation of the toggle mechanism may be incorporated without departing from the spirit and scope of the invention. For example, FIG. 4 illustrates an alternate embodiment using an appropriate toggle mechanism wherein each dog 28a and toggle mechanism 56a is entirely disposed on a non-stationary load block 120. The entire load block 120 is in sliding engagement with two or more support bolts 16a and 16b extending from the powered pushing unit frame 8a. The restricting mechanism comprises separate support springs 12a and 12b that are mounted on support bolts 16a and 16b, respectively, for providing an appropriate load engaging force and for pushing a load 60a. Support bolts 16a and 16b also have separate spacer elements 24a and 24b mounted on them. This embodiment of this invention also includes a return toggle spring 68a interposed between toggle joint 52a and the powered pushing unit frame 8a.

Upon engagement of a load 60a in excess of the predetermined magnitude, as determined by the force set for the support springs 12a and 12b, while the pushing unit 1 is moving in the forward direction 2a, load block 120 slides along support bolts 16a and 16b, compressing support springs 12a and 12b. Upper toggle link 40a then rotates about toggle joint 52a until toggle joint 56a becomes filly elongated and unlocks, thereby allowing rotation of the dog 28a so the pushing unit 1 can bypass the excessive load 60a. Here, again, the lower force of the toggle spring 68a in comparison to the force of the support springs 12a and 12b, determines the force the dog 28a places on the bottom of load 60a. After bypassing the load 60a, toggle spring 68a automatically repositions the dog 28a to its upright position shown in FIG. 4.

Figure 5:
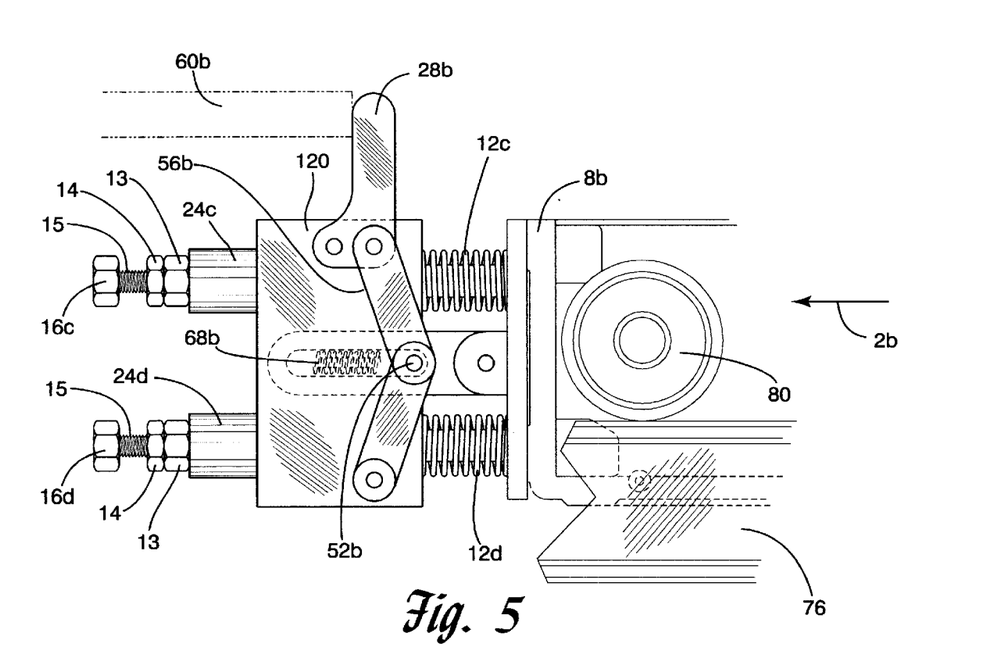
FIG. 5 is a sectional view of a pushing dog and toggle release mechanism having operational characteristics similar to the embodiment illustrated in FIG. 4, but positioned at the front of a pushing unit according to one alternative embodiment of the invention.

The invention is shown and described above in embodiments which have the dog, toggle and associated components positioned behind the powered pushing unit frame. Those skilled in the art will understand that these components may be mounted in other positions on the frame without departing from the spirit and scope of this invention. For example, FIG. 5 illustrates an alternative embodiment using a non-stationary load block toggle mechanism similar to that of FIG. 4. In FIG. 5, the toggle mechanism is positioned in front of the powered pushing unit frame 8b for conveyance of load 60b in a forward direction 2b. Thus, the respective dispositions of the dog 28b, toggle joint 56b, support springs 12c and 12d, and spacer elements 24a and 24b are a mirror image opposite of those shown or described in FIG. 4, although this embodiment operates in substantially the same manner.

Figure 8:
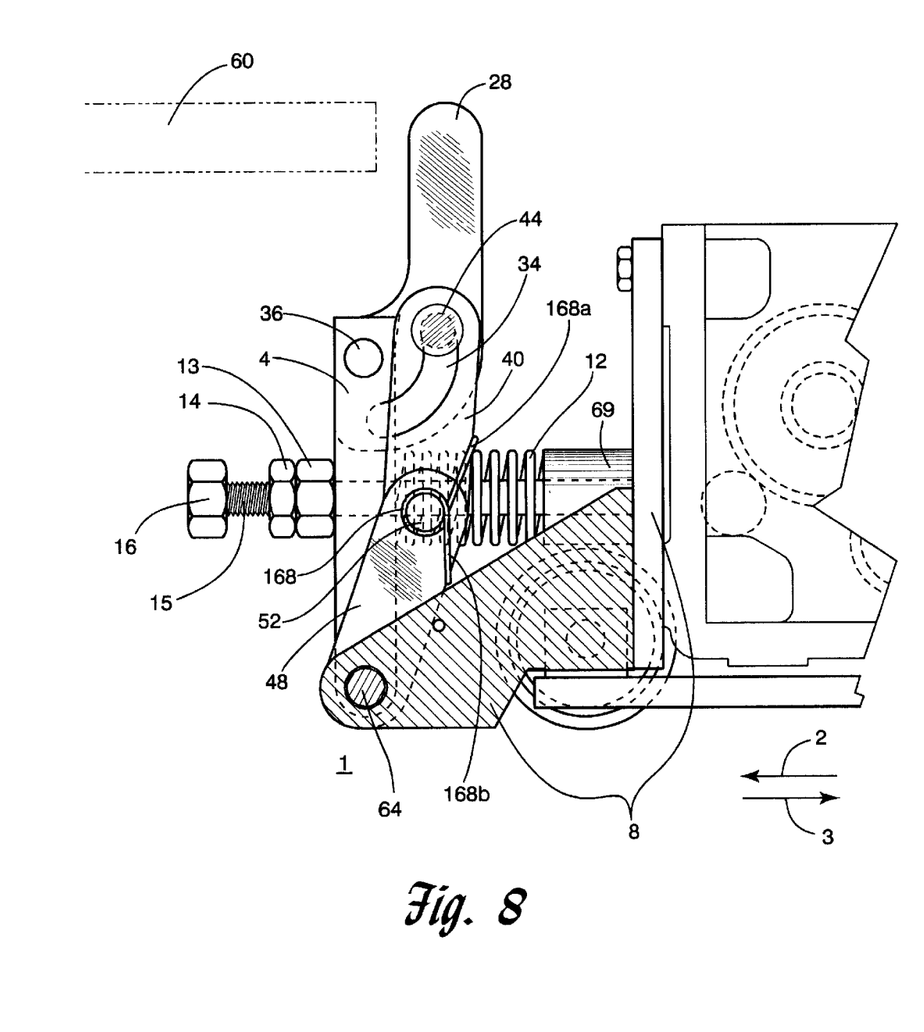
FIG. 8 is a sectional view of a pushing dog support arm and toggle release mechanism placed at the front end of a pushing unit frame according to one embodiment of the invention.

FIG. 8 also illustrates a powered pushing unit 1 having a pushing dog support arm and toggle joint mechanism which operates to push a load in the opposite direction of the powered pushing unit show in FIGS. 1A–1E. Most of the components of the powered pushing unit 1 shown in FIG. 8 are the same as those of the powered pushing unit shown in FIG. 1. However, a spring 12 in FIG. 8 is located and compressed between support arm 4 and block 69. The total length of the support spring 12 is not shown in FIG. 8 due to the illustration of the toggle links 40 and 48.

The toggle spring 168 which is shown in FIG. 8 is a watch spring that is mounted on toggle pivot 52. One end of the watch spring 168 is attached to the upper toggle link 40, while the other end 168b is attached to the lower toggle link 48. As a result, the force of the toggle spring 168 biases the toggle pivot 52 toward the frame 8. The toggle spring 168 operates in the same manner as the toggle spring 68 shown in FIG. 1.

This invention has been explained with respect to the details, arrangements of components and certain specific embodiments shown in the accompanying drawings. Many modifications can be made to these embodiments to those skilled in the art without departing from the spirit and scope of this invention. Thus, the appended claims are intended to be interpreted to cover such equivalent powered pushing units which do not depart from the spirit and scope of this invention.

What is claimed is:

1. A powered pushing unit for use in transferring loads that are no greater than a predetermined magnitude along a predetermined path and for bypassing loads that are greater than the predetermined magnitude, said powered pushing unit comprising:

a pushing unit frame and a source of power for moving said pushing unit frame in a first direction and a second direction, a dog for engaging the loads that are greater than the predetermined magnitude and for engaging the loads that are no greater than predetermined magnitude, said dog being pivotally mounted with respect to said pushing unit frame, and a restricting mechanism applying a load engaging force to hold said dog at a load engaging position as long as said dog is engaging the loads that are no greater than the predetermined magnitude;

a toggle joint connected between said dog and said pushing unit frame, said toggle joint angularly configured in a first angular direction to lock said dog in the load engaging position during engagement of the loads that are no greater than the predetermined magnitude, said toggle joint further configured to shift to a second angular direction upon engagement of the loads that are greater than the predetermined magnitude, the shift to the second angular direction of said toggle joint allowing said dog to pivot away from the loads that are greater than the predetermined magnitude;

a toggle biasing mechanism interconnected between said pushing unit frame and said toggle joint to apply a toggle force to bias said toggle joint in the first angular direction and, when said dog pivots away from the loads that are greater than the predetermined magnitude, to exert a force substantially less than the predetermined magnitude on said dog and from said dog to the loads that are greater than the predetermined magnitude.

2. The powered pushing unit of claim 1 wherein said toggle joint is further configured to remain shifted in the second angular direction, and to allow the reaction force exerted by said dog on the loads that are greater than the predetermined magnitude to be substantially less than the predetermined magnitude as said pushing unit passes under the loads greater than the predetermined magnitude as they are being bypassed.

3. The powered pushing unit of claim 1 further comprising a dog support arm pivotally mounted on said pushing unit frame, said restricting mechanism applying the load engaging force to said dog support arm as long as said dog is not engaging one of the loads that is greater than a predetermined magnitude, said dog being pivotally mounted on said support arm.

4. The powered pushing unit of claim 1, said toggle joint further comprising an upper toggle link and a lower toggle link, said toggle joint providing a locking force for said dog having a magnitude in inverse proportion to the relative angle of said upper and lower toggle links when said toggle joint is positioned in the first angular direction.

5. The powered pushing unit of claim 1, said toggle joint further comprising an upper toggle link and a lower toggle link for providing a locking force for said dog, an adjustable return spring bolt mounted on said toggle biasing mechanism for adjusting the magnitude of the locking force of said toggle joint by changing the relative angle of said upper and lower toggle links when said toggle joint is positioned in the first angular direction.

6. The powered pushing unit of claim 1 further comprising an adjustable toggle bolt for adjusting the magnitude of said load engaging force exerted by said restricting mechanism.

7. The powered pushing unit of claim 1, said source of power comprising a motor mounted on said pushing unit frame, said motor connected to at least one drive wheel for driving said pushing unit along the predetermined path.

8. The powered pushing unit of claim 1, said source of power comprising a motor mounted on said pushing unit frame, said motor connected to at least one cog for driving said pushing unit along the predetermined path.

9. The powered pushing unit of claim 1, said predetermined path comprising at least one I-beam track, said pushing unit further comprising at least one drive wheel and at least one reaction wheel for engaging said I-beam track.

10. The powered pushing unit of claim 1, said source of power set in a fixed position relative to the predetermined path of said pushing unit, said source of power capable of driving said pushing unit in the first and second directions along the predetermined path.

11. The powered pushing unit of claim 1, said source of power set in a fixed position relative to the predetermined path of said pushing unit, said source of power being configured to effect movement of said pushing unit in the first and second directions along the predetermined path through a chain connected to said pushing unit frame.

12. The powered pushing unit of claim 1 having a plurality of dog support arms, each said dog support arm having an individual dog mounted thereon that can simultaneously engage a single load.

13. The powered pushing unit of claim 1, said dog having a dog spring for producing a dog spring force having a magnitude substantially less than the predetermined magnitude, said dog spring force biasing said dog toward a load engaging position on said dog support arm for engaging the loads when said pushing unit is traveling in the first direction, said dog being configured to pivot against said dog spring force to bypass the loads when said pushing unit is traveling in the second direction.

14. The powered pushing unit of claim 1 further comprising a dog support arm pivotally mounted on said pushing unit frame, said restricting mechanism applying a load engaging force to said dog support arm as long as said dog is not engaging one of the loads that is greater than a predetermined magnitude, said dog being pivotally mounted on said dog support arm, a spacer element mounted on said pushing unit frame for restricting forward pivotal movement of said dog support arm, said spacer element orienting said dog support arm to an upright position as said dog support arm remains under the compression of the load engaging force exerted by said restricting mechanism.

15. The powered pushing unit of claim 1 having a plurality of support bolts mounted on said pushing unit frame, said toggle joint mounted on a non-stationary load block in sliding engagement with said plurality of support bolts, said load block also under the continued compression of the load engaging force exerted in the forward direction by said restricting mechanism;

said load engaging force positioning said support block sufficiently in the forward direction to maintain said toggle in an angular configuration in the first angular direction to lock said dog in load engaging position during engagement of the loads that are no greater than the predetermined magnitude;

said load engaging force further allowing said support block to slide sufficiently away from the forward direction, permitting said toggle to assume an angular configuration in the second angular direction and unlock said dog from its load engaging position during engagement of the loads that are greater than the predetermined magnitude.

16. A powered pushing unit for transferring a load of no greater than a predetermined magnitude along a predetermined path comprising:

a pushing unit frame and a source of power for moving said pushing unit frame in a first direction arid a second direction, a first dog support arm and a second dog support arm, each said dog. support arm pivotally mounted on said pushing unit frame, and a restricting mechanism for applying a load engaging force to said first and second dog support arms to hold said dog support arms at a load engaging position as long as the load is no greater than the predetermined magnitude;

a first dog pivotally mounted on said first dog support arm, a second dog pivotally mounted on said second dog support arm, said first and second dogs each having a dog spring for producing a dog spring force which biases each dog toward a load engaging position on said dog support arms for engaging and transferring the load when said pushing unit is traveling in a first direction, said dogs configured to pivot on said dog support arms against said dog spring forces to bypass the load when said pushing unit is traveling in a second direction toggle joint connected between said dogs and said pushing unit frame, said toggle joint comprising an upper toggle link and a lower toggle link, said toggle joint being angularly configured in a first angular direction to lock said dog in a load engaging position during engagement of the load no greater than the predetermined magnitude, said toggle joint further configured to shift to a second angular direction upon engagement of a load that is greater than the predetermined magnitude, the shift to the second angular direction of said toggle joint allowing said dogs to pivot away from the load that is greater than the predetermined magnitude;

said restricting mechanism being configured to substantially release said load engaging forces after said dogs begin to pivot away from the load that is greater than the predetermined magnitude, allowing said dogs to pass under the load that is greater than the predetermined magnitude;

said toggle joint being further configured to remain shifted in the second angular direction, and to allow the reaction force exerted by said dogs on loads to be substantially less than the predetermined magnitude as said pushing unit passes under the load that is greater than the predetermined magnitude;

a toggle biasing mechanism interconnected between said pushing unit frame and said toggle joint to apply a toggle force to bias said toggle joint in the first angular direction.

* * * * *